(12) United States Patent
Ren

(10) Patent No.: US 12,286,365 B2
(45) Date of Patent: Apr. 29, 2025

(54) GRAVITY WATER FILTER

(71) Applicant: Jie Ren, Hengshui (CN)

(72) Inventor: Jie Ren, Hengshui (CN)

( * ) Notice: Subject to any disclaimer, the term of this patent is extended or adjusted under 35 U.S.C. 154(b) by 0 days.

(21) Appl. No.: 18/419,423

(22) Filed: Jan. 22, 2024

(65) Prior Publication Data

US 2025/0034004 A1     Jan. 30, 2025

(51) Int. Cl.
    *C02F 1/44*     (2023.01)

(52) U.S. Cl.
    CPC ........ *C02F 1/444* (2013.01); *C02F 2201/004* (2013.01); *C02F 2201/008* (2013.01); *C02F 2307/10* (2013.01)

(58) Field of Classification Search
    CPC ............... C02F 1/444; C02F 2201/004; C02F 2201/008; C02F 2307/10; C02F 1/002; C02F 1/003; C02F 2307/04
    USPC ........................................ 210/474, 482, 282
    See application file for complete search history.

(56) References Cited

U.S. PATENT DOCUMENTS

| | | | | |
|---|---|---|---|---|
| 1,674,203 A | * | 6/1928 | Holz ........................ | C02F 1/001 210/489 |
| 4,636,307 A | * | 1/1987 | Inoue ..................... | B01D 61/18 96/6 |
| 7,081,201 B2 | * | 7/2006 | Bassett ................... | B01D 61/18 210/493.1 |
| 7,850,859 B2 | * | 12/2010 | Tanner .................... | C02F 1/003 210/473 |
| 8,414,767 B2 | * | 4/2013 | Gaignet ................. | B01D 61/10 210/321.74 |
| 9,005,435 B2 | * | 4/2015 | Takeda ................... | B01D 35/02 210/291 |
| 9,193,605 B2 | * | 11/2015 | Minton-Edison ....... | C02F 1/002 |

FOREIGN PATENT DOCUMENTS

DE     202018104820 U1 * 10/2018

OTHER PUBLICATIONS

English Translation of DE 202018104820 U1 from PE2E Search database (Year: 2018).*

* cited by examiner

*Primary Examiner* — Terry K Cecil

(57) ABSTRACT

A gravity water filter comprises a cover, a filter water bucket, a purified water bucket, and a filter element component; wherein the cover, the filter water bucket and the purified water bucket are detachably connected from top to bottom; a water flowing hole is arranged at the bottom of the filter water bucket; the filter element component is arranged in the filter water bucket through a sealed fixed structure, and the water outlet port of the filter element component is connected to the purified water bucket. The advantage of adopting the above technical solutions is that through the action of gravity, clean and drinkable water is obtained through filtration by the filter element component and flows to the purified water bucket. The watch window facilitates users to observe the remaining amount of purified water, and the accommodating slot reduces the unfilterable liquid to be filtered in the filter water bucket.

9 Claims, 7 Drawing Sheets

GRAVITY WATER FILTER

CROSS-REFERENCE TO RELATED APPLICATIONS

The present patent utility is a continuation-in-part application of the U.S. non-provisional patent application series which is titled "Gravity water filter" in patent Ser. No. 29/855,934. It was submitted on Oct. 8, 2022, and the first inventor is Jie Ren.

TECHNICAL FIELD

The present utility patent relates to the technical field of drinking water purification, and in particular, for a gravity water filter.

BACKGROUND

To obtain safe drinking water that can be directly consumed, you must ensure that there are no pathogenic bacteria, insect eggs, sediment and other contaminants in the drinking water. Drinking unclean water will cause water-borne diseases such as diarrhea, vomiting, fever and so on. Generally, added disinfectants such as residual chlorine, disinfectant tablets, ultraviolet sterilization and filter sterilization can be used. Filtration and sterilization is a quick and safe way to obtain safe drinking water. In some remote and backward areas at home and abroad, a large number of people still lack access to safe drinking water. These are often areas that lack piped running water and electricity. Generally, a water purifier which is installed in the tap water pipeline and requires tap water pressure or to be powered by electricity is unable to function.
A gravity water purifier that simply take advantage of water level differences is the first choice to solve this problem.

However, existing gravity water filters such as the patent (U.S. Pat. No. 8,480,893B2) "Gravity-flow water purifier" do not have a part for storing purified water and need to be supported on the ground by supporting legs. When in use, they need to use cups and other containers to catch the dripping purified water for a long time. When small containers such as water cups are filled, it is easy to waste water, and it also need to take a long time to obtain a sufficient amount of purified water.

SUMMARY OF THE PRESENT UTILITY PATENT

The purpose of the present utility patent is to provide a gravity water filter in view of the defects and shortcomings of the prior art. The gravity water purifier has the following advantages: it is easy to carry, purifies water sources, and provides users with safe and hygienic drinking water; the purified water bucket is equipped with a watch window so that users can replenish the liquid to be filtered according to needs, and reduces the unfilterable liquid to be filtered in the filter water bucket.

To achieve the above purpose, the technical solutions adopted in the present utility patent are: a gravity water filter, is characterized in that, includes a cover, a filter water bucket, a purified water bucket, a filter element component and a sealed fixed structure; wherein the cover, the filter water bucket and the purified water bucket are detachably connected from top to bottom; wherein filter water bucket is provided with at least one water flowing hole at the bottom; the filter element component is fixed in the filter water bucket through the sealed fixed structure and corresponds to the water flowing hole one by one; the water outlet port of the filter element component is connected to the purified water bucket; a purified water outlet is arranged on the lower side wall of the purified water bucket near the bottom of the purified water bucket, and the purified water bucket is provided with a switch valve to open or close the purified water outlet.

Optionally, the sealed fixed structure includes: a water outlet nozzle, a first sealing piece, a second sealing piece and a nut; the water outlet nozzle is arranged on the bottom surface of the filter element component, and a first threaded part is arranged on the outer side wall of the water outlet nozzle; the water outlet nozzle passes through a water flowing hole and is arranged in the purified water bucket, and the water outlet port is arranged on the water outlet nozzle; the first sealing piece is arranged outside the water outlet nozzle and is located between the bottom surface of the filter element component and the filter water bucket; the second sealing piece is arranged outside the water outlet nozzle and is located below the filter water bucket; the nut is engaged with the first threaded part and is located below the second sealing piece.

Optionally, the filter element component includes: a filter element body and a bottom cover; the filter element body is fixedly arranged on the top of the bottom cover, and the water outlet port penetrates the bottom cover.

Optionally, there is an accommodating slot in the downward depression at the bottom of the filter water bucket. The depth of the accommodating slot is equal to the height of the bottom cover. The accommodating slot is used for placing the bottom cover, and is penetrated by the water flowing hole.

Optionally, the filtered element body includes: an activated carbon filter bin and an ultra-filtration membrane filter element are arranged in sequence from the outside to the inside; the top of the bottom cover is provided with a first installation part and a second installation part in sequence from the inside to the outside; the first installation part is provided with a first installation slot for fixing the lower part of the ultra-filtration membrane filter element, and the second installation part is provided with a second installation slot for fixing the lower part of the activated carbon filter bin, so the ends of the water outlet port are respectively connected to the first installation slot and the purified water bucket.

Optionally, the lower outer side wall of the ultra-filtration membrane filter element and the inner side wall of the first installation slot are both provided with second threaded parts that capable of meshing with each other.

Optionally, the top surface of the purified water bucket is an opening, a limiting convex edge is arranged on the outer side wall of the lower part of the filter water bucket, and an inserting part is arranged on the bottom of the filter water bucket and is located below the limiting convex edge, which is capable of being inserted into the opening of the purified water bucket; when the insertion part is inserted into the opening of the purified water bucket, the limiting convex edge is limited at the edge of the opening of the purified water bucket.

Optionally, a transparent watch window is arranged on the outer side wall of the purified water bucket.

Optionally, the top of the cover is provided with a handle.

Optionally, the bottom of the purified water bucket is provided with a supporting base.

Optionally, the bottom of the purified water bucket is provided with an anti-slip ring.

Adopting the above technical solutions, the beneficial effects of the present patent utility are: a gravity water filter includes a cover, a filter water bucket, a purified water bucket and a filter element component. The cover, filter water bucket and purified water bucket are detachably connected from top to bottom. At least one water flowing hole is arranged at the bottom of the filter water bucket. The filter element component is arranged in the filter water bucket through a sealed fixed structure and corresponds to the water flowing holes one by one. The water outlet port of the filter element component is connected to the purified water bucket. Under the action of gravity, the liquid to be filtered in the filter water bucket flows through the filter element component to obtain the purified water after filtration, and then enters the purified water bucket through the water flowing hole and is stored in the purified water bucket. The filter element component is used to filter the sediment, algae and bacteria in the liquid to be filtered to obtain purified water. A purified water outlet is arranged on the lower side wall of the purified water bucket near the bottom surface of the purified water bucket. A switch valve is arranged on the purified water bucket to open or close the purified water outlet. When in use, just open the switch valve to drink clean drinking water immediately. The filter water bucket and the purified water bucket are connected and stacked one after another. You only need to fill the original water bucket with the liquid to be filtered, and the purified water can be dripped into the purified water bucket without the user's presence.

A transparent watch window is arranged on the outer side wall of the purified water bucket. This allows users to observe the amount of purified water in the purified water bucket and replenish the liquid to be filtered in time.

The filter element component includes: a filter element body and a bottom cover. The filter element body is fixedly arranged on the top of the bottom cover, and the water outlet port passes through the bottom cover. The bottom of the filter water bucket is recessed downward with an accommodating slot, whose depth is equal to the height of the bottom cover. The accommodating slot is used to accommodate the bottom cover, and the water flowing hole runs through the accommodating slot, which reduce the remaining liquid in the filter water bucket that cannot be filtered by the filter element component.

BRIEF DESCRIPTION OF THE FIGURES

To better illustrate the technical solutions of the embodiment of the present utility patent or the technical solutions of the prior art, a brief introduction of the figures that need to be used in the embodiment or the description of the prior art will be given below. As it shown below, the figures in the following description are only some embodiments of the present utility patent, for those of ordinary skilled in the art, other figures can also be obtained based on these figures without inventive efforts.

Figure 1:
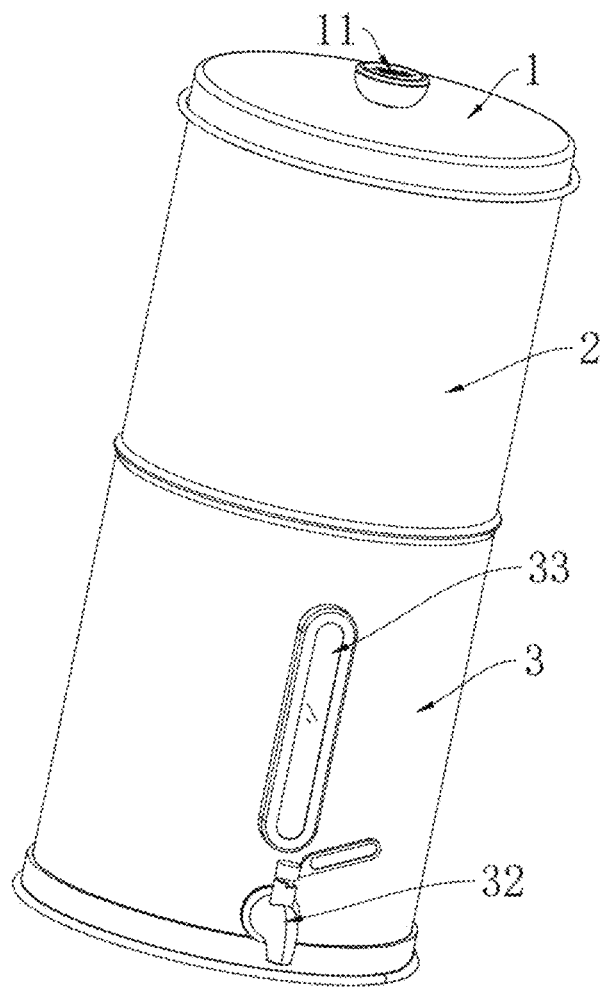
FIG. 1 is a structure schematic view of the gravity water filter of the present utility patent.

Reference signs in the figures: 1—Cover; 2—filter water bucket; 3—purified water bucket; 4—filter element component; 5—sealed fixed structure; 21—water flowing hole; 41—water outlet port; 31—purified water outlet; 32—switch valve; 51—water outlet nozzle; 52—first sealing piece; 53—second sealing piece; 54—nut; 55—first threaded part; 42—filter element body; 43—bottom cover; 22—accommodating slot; 421—activated carbon filter bin; 422—ultra-filtration membrane filter element; 431—first installation slot; 432—second installation slot; 44—second threaded part; 45—top cover; 23—limiting convex edge; 24—inserting part; 33—watch window; 11—handle; 6—supporting base; 7—anti-slip ring; 12—gasket; 13—screws.

DETAILED DESCRIPTION OF THE EMBODIMENTS

Below is a further detailed description of the present utility patent based on the figures.

The present embodiment only shows an explanation of the present utility patent and it is not a limitation to the present utility patent. The skilled in the art can make modifications to this embodiment as needed without making any creative contributions after reading this specification, which are always protected by the patent law as long as they are within the scope of the claims of the present utility patent.

It should be noted that when an element is called as being "fixed to", "attached to" or "arranged on" another element, it can be directly on the other element or indirectly on the other element. When an element is called as being "connected to" another element, it can be directly connected to the other element or indirectly connected to the other element.

It should be noticed that the terms "length", "width", "top", "bottom", "front", "rear", "left", "right", "vertical", "horizontal", "top", "bottom", "inside" and "outside" which indicates the orientations or positional relationships are based on the orientations or positional relationships shown in the figures. They are only for facilitating describing the present invention and simplifying the description, rather than indicating or implying that the device or component must have a specific orientation, construct and operate in a specific orientation, therefore, it understood as a limitation of the present invention.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present invention, "a plurality of" means two or more, unless otherwise specifically defined.

This embodiment relates to a gravity water filter, as shown in FIGS. 1-4, including: a cover 1, a filter water bucket 2, a purified water bucket 3, a filter element component 4 and a sealed fixed structure 5.

The cover 1, the filter water bucket 2 and the purified water bucket 3 are detachably connected in sequence from top to bottom, which is easy to carry and transport. The bottom of the filter water bucket 2 is provided with at least one water flowing hole 21. Among them, the top surface of the filter water bucket 2 is an opening, and the cover 1 is arranged at the opening of the filter water bucket 2 to avoid further contamination of the liquid to be filtered. A handle 11 is arranged on the top of the cover 1 so that the user can open the filter water bucket through the handle 11 to facilitate the user to add liquid to be filtered according to needs. The filter element component 4 is sealed and fastened to the filter water bucket 2 through the sealed fixed structure 5. The filter element component 4 corresponds to the water flowing hole 21 one by one. The water outlet port 41 of the filter element component 4 is connected to the purified water bucket 3. The purified water filtered by the filter element component 4 enters into the purified water bucket 3 through the water flowing hole 21 and is stored in the purified water bucket 3. The filter element component 4 is used to filter sediment, algae, bacteria or others in the liquid to be filtered to obtain purified water. A purified water outlet 31 is arranged on the lower side wall of the purified water bucket 3 close to the bottom surface of the purified water bucket 3. A switch valve 32 is arranged on the purified water bucket 3 to open or close the purified water outlet 31. The switch valve 32 can be a faucet of prior art. The user can obtain safe drinking water from the purified water bucket 3 by opening and closing the switch valve 32.

Optionally, the handle 11 is fixed on the top of the cover through two gaskets and screws. In some implementations, the handle is fixed on the top of the cover by welding.

Figure 2:
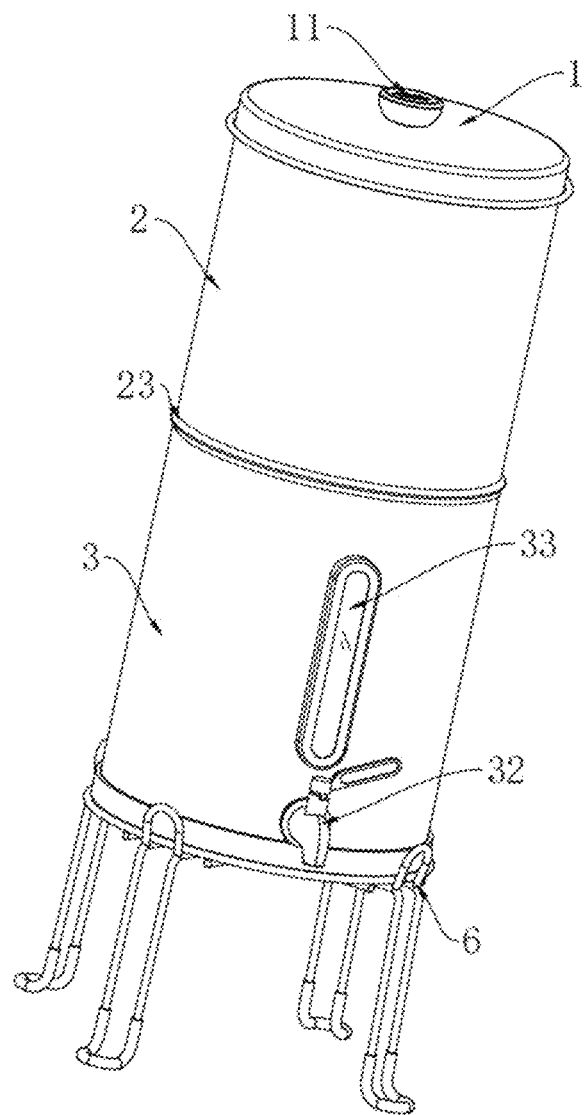
FIG. 2 is a structure schematic view of the gravity water filter with supporting base.
Figure 4:
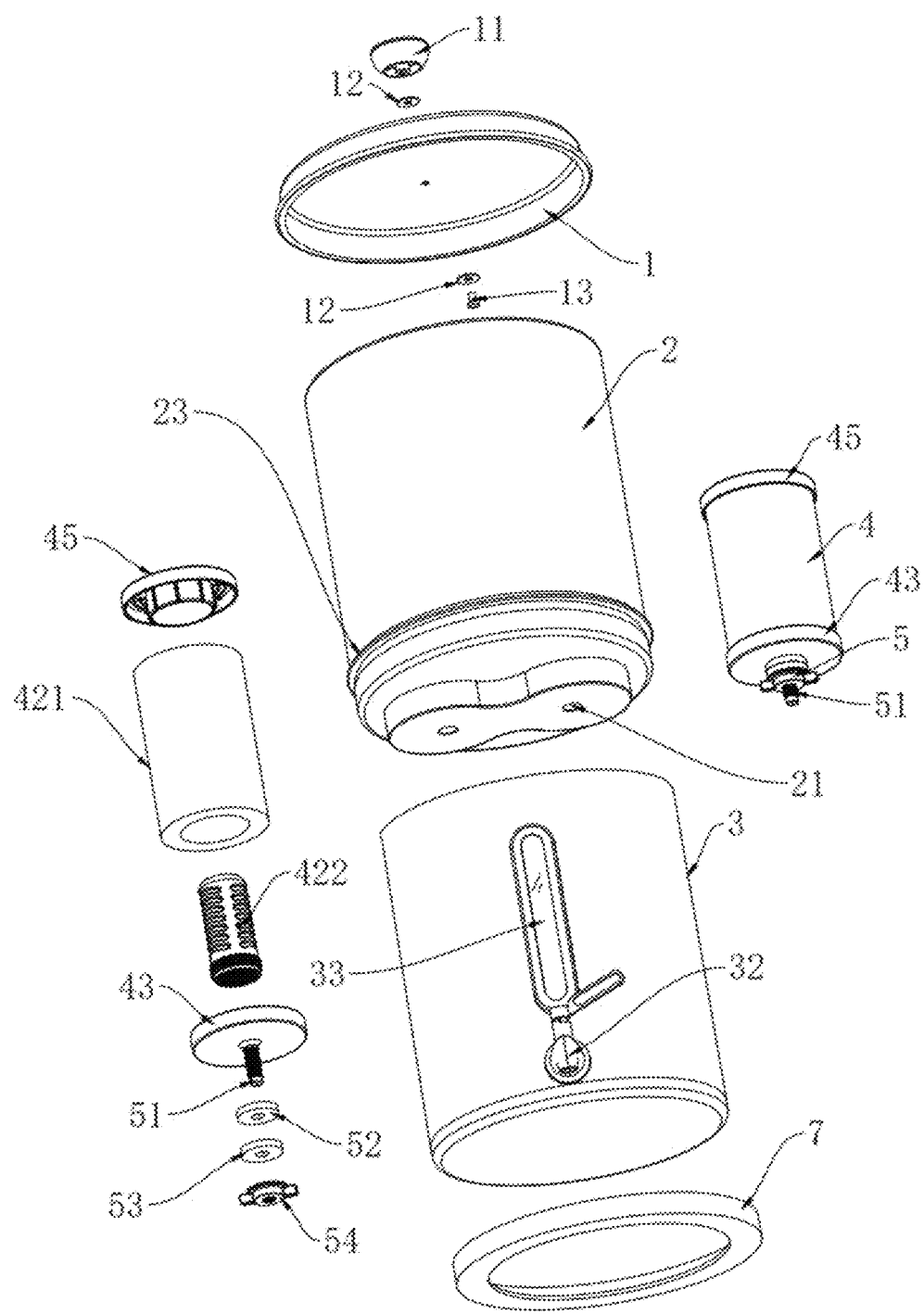
FIG. 4 is another exploded view of the gravity water filter of the present utility patent.

Optionally, as shown in FIGS. 1, 2, and 4, the filter water bucket 2 and the purified water bucket 3 are made of alloy materials or edible plastic materials. The filter water bucket 2, the purified water bucket 3, and the cover 1 are all opaque. Thereby, the liquid to be filtered and the purified water in the filter water bucket 2 and the purified water bucket 3 are reduced from being exposed to the sun. In this embodiment, both the filter water bucket 2 and the purified water bucket 3 are made of alloy materials such as stainless steel. Optionally, a transparent watch window 33 is arranged on the outer side wall of the purified water bucket 3. The watch window 33 is fixed on the purified water bucket 3 by welding, so that the user can observe the remaining amount of purified water in the purified water bucket 3. Optionally, the side wall of the purified water bucket 3 is provided with an opening. The watch window 33 includes a metal frame and a transparent window. The transparent window is arranged on the opening of the side wall of the purified water bucket 3. The metal frame fixes the transparent window body on the purified water bucket 3, and the metal frame is welded on the purified water bucket 3. Furthermore, sealing rings are arranged among the transparent window body, the metal frame and the purified water bucket 3.

In some embodiments, the side wall of the purified water bucket 3 is provided with an opening, and the watch window 33 includes a transparent window body covering the opening. The transparent window body is fixed to the purified water bucket 3 through adhesive or hot injection molding. Optionally, a watch window 33 is arranged on the outer side wall of the filter water bucket 2 so that the user can observe the amount of liquid to be filtered in the filter water bucket 2 and replenish the liquid to be filtered in time.

Figure 3:
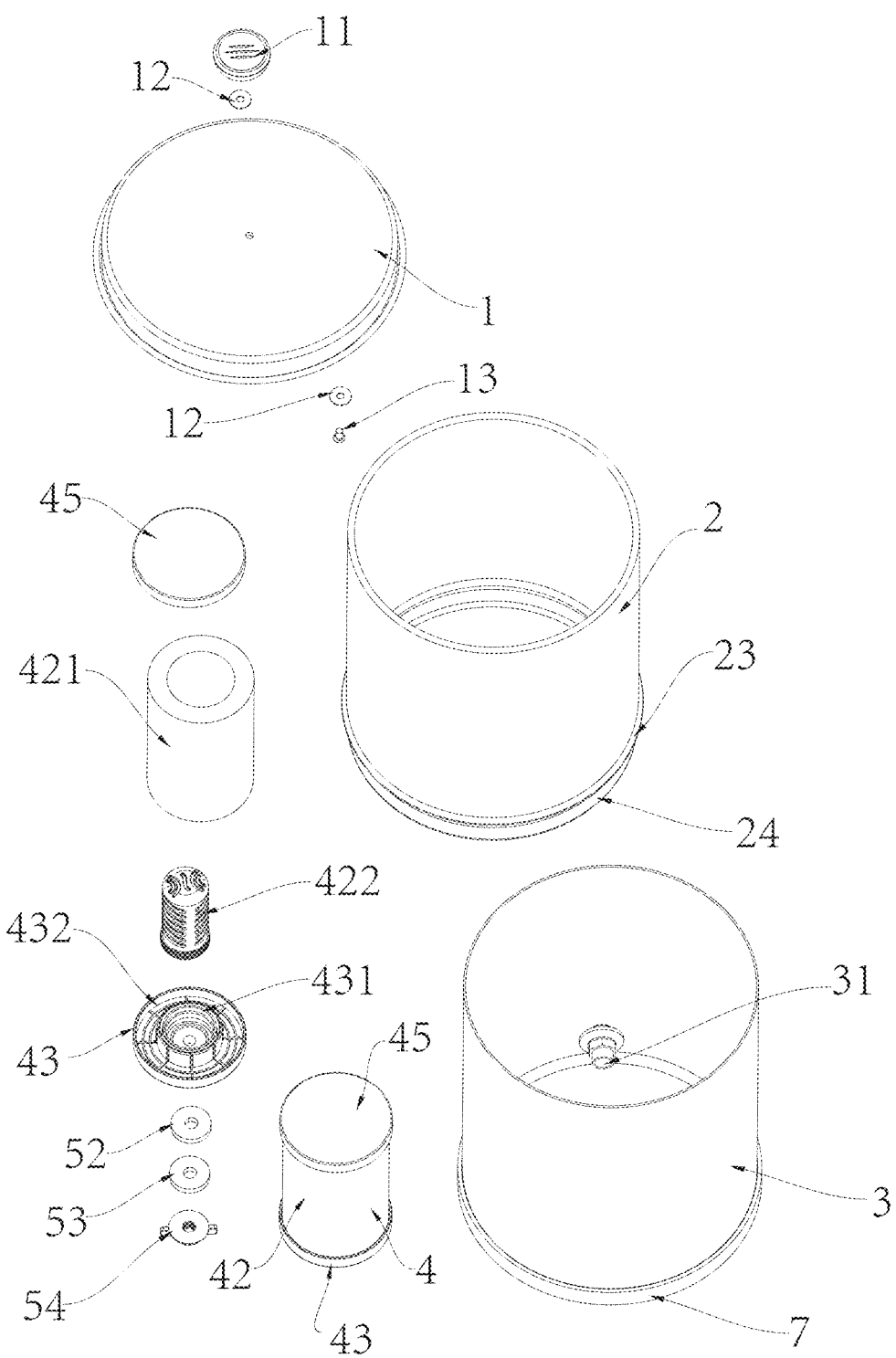
FIG. 3 is an exploded view of the gravity water filter of the present utility patent.
Figure 5:
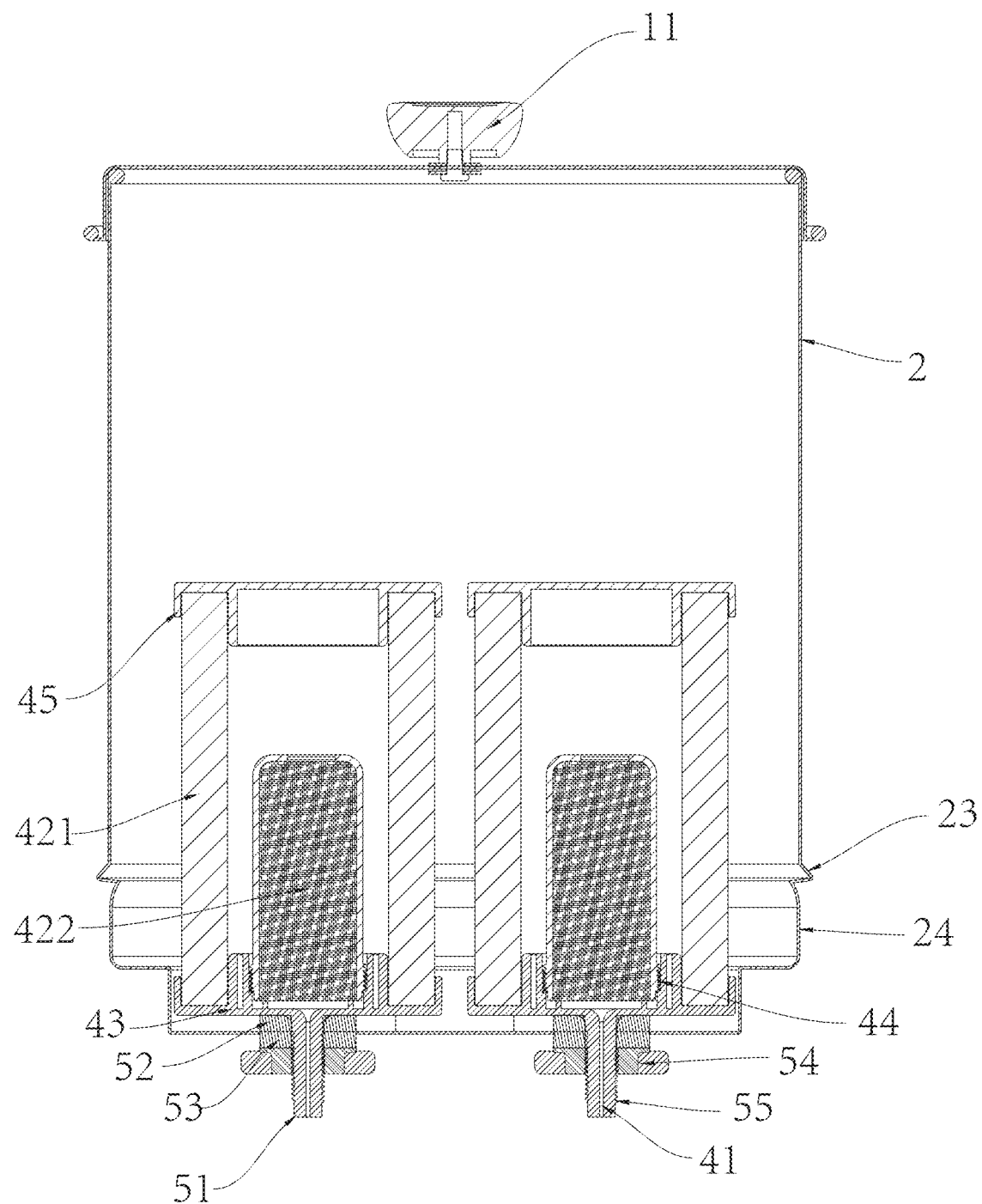
FIG. 5 is a cross-sectional view of the filter element component of the present utility patent.
Figure 6:
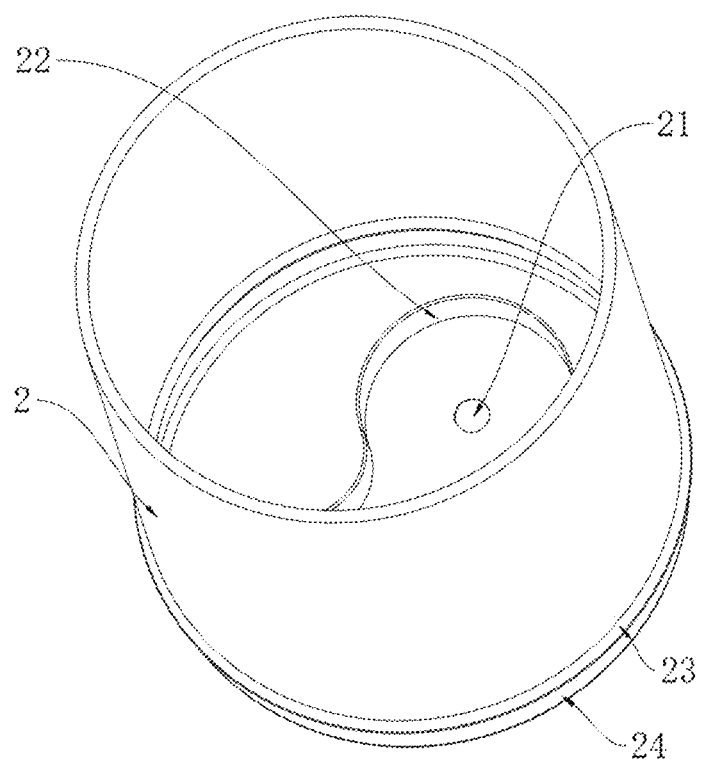
FIG. 6 is a structure schematic view of the filter water bucket of the present utility patent.
Figure 7:
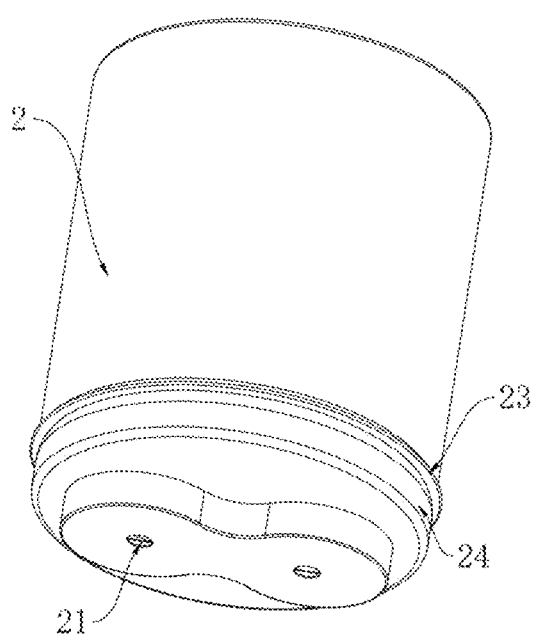
FIG. 7 is a structure schematic view of another direction of the filter water bucket of the present utility patent.
Figure 8:
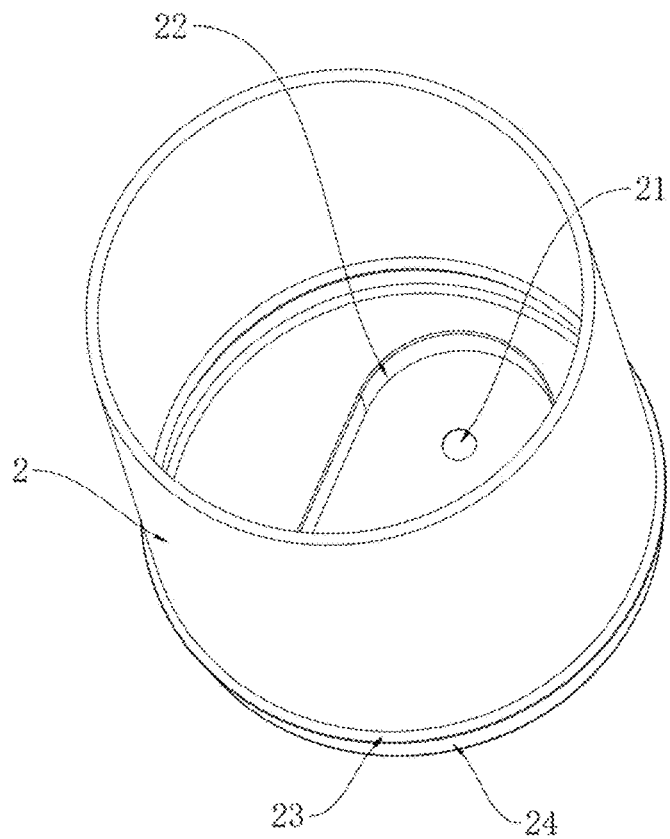
FIG. 8 is a structure schematic view of another solution of the filter water bucket of the present utility patent.
Figure 9:
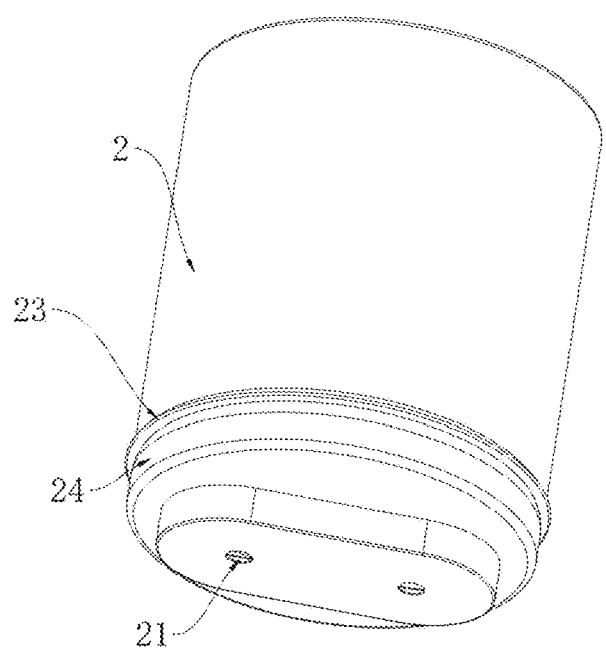
FIG. 9 is a structure schematic view of another direction of FIG. 8.

Optionally, in order to facilitate the stable fixation of the filter element component 4 in the filter water bucket 2, and facilitate the user to disassemble the filter element component 4 from the filter water bucket 2 to clean or replace of the filter component, as shown in FIGS. 3-5, the sealed fixed structure 5 includes: a water outlet nozzle 51, a first sealing piece 52, a second sealing piece 53 and a nut 54. The water outlet nozzle 51 is arranged on the bottom surface of the filter element component 4. A first threaded part 55 is arranged on the outer side wall of the water outlet nozzle 51. The water outlet nozzle 51 passes through the water flowing hole 21 and is placed in the purified water bucket 3. The water outlet port 41 is arranged outside of the water outlet nozzle 51. The first sealing piece 52 is sleeved outside the water outlet nozzle 51 and is located between the bottom surface of the filter element component 4 and the filter water bucket 2. The second sealing piece 53 is sleeved outside the water outlet nozzle 51 and located below the filter water bucket 2. The first sealing piece 52 and the second sealing piece 53 are both silicone sealing rings. The nut 54 is engaged with the first threaded part 55 and is located below the second sealing piece 53. The arrangement of the first sealing piece 52 and the second sealing piece 53 enhances the sealing between the filter element component 4 and the filter water bucket 2, preventing unfiltered liquid to be filtered from leaking into the purified water bucket 3 through the water flowing hole 21 to cause contamination of the purified water in the purified water bucket 3.

Optionally, in order to facilitate the fixation of the filter element component 4 in the filter water bucket 2, as shown in FIGS. 3-5, the filter element component 4 includes: a filter element body 42 and a bottom cover 43. The filter element body 42 is fixedly arranged on the top of the bottom cover 43. The water outlet port 41 penetrates the bottom cover 43. Furthermore, the water outlet nozzle 51 is integrally arranged on the bottom cover 43, and the water outlet nozzle 51 extends downward from the bottom surface of the bottom cover 43. The water outlet port 41 penetrates the water outlet nozzle 51.

Optionally, in order to reduce the remaining liquid to be filtered in the filter water bucket 2 that cannot be filtered by the filter element component 4, as shown in FIGS. 6-9, the bottom of the filter water bucket 2 is recessed with an accommodating slot 22, whose depth is the same as the height of the bottom cover 43. The accommodating slot 22 is used to accommodate the bottom cover 43, and the water flowing hole 21 penetrates the accommodating slot 22. The arrangement of the accommodating slot 22 facilitates the positioning and installation between the filter element component 4 and the filter water bucket 2, and at the same time reduces the possibility that all the liquid to be filtered in the filter water bucket 2 cannot be filtered by the filter element component 4 and then flows into purified water due to the bottom cover 43 of the filter element component 43. After the filtration is completed, there is a relatively large amount of residue in the liquid to be filtered in the filter water bucket 2. In one embodiment, the number of accommodating slot 22 corresponds to the number of filter element components 4 one-to-one. When two filter element components 4 are provided, the two accommodating slots 22 are connected with each other, and the two accommodating slots 22 can be combined into a gourd shape or a rectangular shape. In one embodiment, there is one filter element component 4 is provided. The accommodating slot 22 is formed by a downward recess in the middle of the bottom surface of the filter water bucket 2. The accommodating slot 22 may be circular or rectangular.

Optionally, as shown in FIGS. 3-5, the filter element body 42 includes: an activated carbon filter bin 421 and an ultra-filtration membrane filter element 422 arranged sequentially from the outside to the inside. A bottom cover 43 is arranged at the bottom of the activated carbon filter bin 421. The top of the bottom cover 43 is provided with a first installation part and a second installation part in sequence from the inside to the outside. The first installation part is provided with a first installation slot 431 for fixing the lower part of the ultra-filtration membrane filter element 422, and the second installation part is provided with a second installation slot 432 for fixing the lower part of the activated carbon filter bin 421, and the water outlet port 41 communicates with the first installation slot 431 and the purified water bucket 3 respectively. In this embodiment, the water outlet nozzle 51 is integrally arranged on the bottom cover 43. The water outlet nozzle 51 and the bottom cover 43 are coaxially arranged. The water outlet port 41 penetrates the water outlet nozzle 51 and the first installation slot 431 in sequence. The arrangement of the activated carbon filter bin 421 and the ultra-filtration membrane filter element 422 allows the present patent utility to require no external power supply or connection to the water supply pipeline. It only needs to inject the liquid to be filtered into the filter water bucket 2, and it will automatically seep down and sequentially through the gravity of the water, and then run through the activated carbon filter bin 421 and the ultra-filtration membrane filter element 422 to achieve the purification effect.

It should be noted that under the action of gravity, the liquid to be filtered is filtered and adsorbed by the activated carbon filter bin 421 and then filtered by the ultra-filtration membrane filter element 422 to form purified water. The purified water drips into the purified water bucket 3 through the water outlet nozzle 51.

In some embodiments, as shown in FIGS. 3-5, the filter element component 4 further includes a top cover 45, which is fixed on the top of the activated carbon filter bin 421. Optionally, in order to facilitate the assembly of the filter element component 4, the lower outer side wall of the ultra-filtration membrane filter element 422 and the inner side wall of the first installation slot 431 are both provided with second threaded parts 44 that can mesh with each other. In some embodiments, the top cover 45 can be fixed to the top of the activated carbon filter bin 421 through food-grade glue, and one end of the activated carbon filter bin 421 can be fixed in the second installation slot 432 of the bottom cover 43 through food-grade glue.

Optionally, in order to speed up the filtration and purification efficiency of the liquid to be filtered in the filter water bucket 2, the filter element component 4 and the water flowing hole 21 are each provided with two. In other embodiments, both of the filter element component 4 and the water flowing hole 21 are provided with one, three, four, etc.

Optionally, in order to facilitate stable stacking of the filter water bucket 2 and the purified water bucket 3, as shown in FIGS. 1-9, the top surface of the purified water bucket 3 is an opening, and the lower outer side wall of the filter water bucket 2 is provided with a limiting convex edge 23. An inserted part 24 is arranged on the lower part of the filter water bucket 2 and below the limiting convex edge 23, which capable of being inserted into the opening of the purified water bucket 3. When the inserted part 24 is connected to the opening of the purified water bucket 3, the limiting convex edge 23 is limited at the edge of the opening of the purified water bucket 3. The filter water bucket 2 and the purified water bucket 3 are arranged separately, so that users can clean the filter water bucket 2 and the purified water bucket 3 respectively, further avoiding the growth of bacteria and ensuring the hygiene of drinking water.

In some embodiments, as shown in FIG. 2, a supporting base 6 is arranged at the bottom of the purified water bucket 3. The supporting base 6 can be a metal frame. The purified water bucket 3 can be stably placed on the metal frame. The edge of the top surface of the metal frame is provided with a plurality of bulges for limiting the purified water bucket 3 inside.

In some embodiments, as shown in FIG. 4, the bottom of the purified water bucket 3 is provided with an anti-slip ring 7, thereby increasing the friction of the gravity water filter and allowing the gravity water filter to be stably placed on the table and other places. Optionally, the anti-slip ring 7 is a rubber sleeve or silicone sleeve set on the bottom surface of the purified water bucket 3. Optionally, the anti-slip ring 7 is a foam pad, a rubber pad or a silicone pad pasted on the bottom surface of the purified water bucket 3.

The above only aims to illustrate the technical solution of the present utility patent without limitation. Any other modifications or equivalent replacements of the technical solution of the present utility patent made by ordinary skilled in the art should be included in the scope of the claims of the present utility patent as long as they do not deviate from the technical solution spirit and scope of the present utility patent.

The invention claimed is:

1. A gravity water filter comprises a cover, a filter water bucket, a purified water bucket, a filter element component and a sealed fixed structure; wherein the cover, the filter water bucket and the purified water bucket are detachably connected from top to bottom; wherein the filter water bucket is provided with at least one water flowing hole at a bottom thereof; an accommodating slot is arranged at the bottom of the filter water bucket; a depth of the accommodating slot is equal to a height of a bottom cover of the filter element received therein and includes the water flowing hole; the filter element component is fixed in the filter water bucket with the sealed fixed structure extending through the water flowing hole; the filter element component further comprises a filter element body and the bottom cover, wherein the filter element body is fixedly arranged on a top of the bottom cover, and a water outlet port of the filter element component defines a water flow path from the filter element body through the bottom cover, the sealed fixed structure, and the water flowing hole and is in fluid communication with the purified water bucket; a purified water outlet is arranged on a lower side wall of the purified water bucket near to a bottom of the purified water bucket, and the purified water bucket is provided with a valve to open or close the purified water outlet.

2. The gravity water filter according to claim 1, wherein the sealed fixed structure further comprises: a water outlet nozzle, a first sealing piece, a second sealing piece and a nut; the water outlet nozzle is arranged on a bottom surface of the filter element component, and a first threaded part is arranged on an outer side wall of the water outlet nozzle; the water outlet nozzle passes through a water flowing hole and is placed in the purified water bucket, and the water outlet port is arranged on the water outlet nozzle; the first sealing piece is arranged outside the water outlet nozzle and is located between bottom surface of the filter element component and the filter water bucket; the second sealing piece is arranged outside the water outlet nozzle and is located below the filter water bucket; the nut is engaged with a first threaded part and is located below the second sealing piece.

3. The gravity water filter is according to claim 1, wherein the filtered element body further comprises: an activated carbon filter bin and an ultra-filtration membrane filter element, which are arranged in sequence from outside to inside; a top of the bottom cover is provided with a first installation part and a second installation part in sequence from inside to outside; the first installation part is provided with a first installation slot for fixing a lower part of the ultra-filtration membrane filter element, and the second installation part is provided with a second installation slot for fixing a lower part of the activated carbon filter bin, so water outlet port ends are respectively connected to the first installation slot and in fluid communication with the purified water bucket.

4. The gravity water filter according to claim 3, wherein a lower outer side wall of the ultra-filtration membrane filter element and an inner side wall of the first installation slot are both provided with a threaded part capable of meshing with each other.

5. The gravity water filter according to claim 1, wherein a top surface of the purified water bucket is an opening, a limiting convex edge is arranged on the outer side wall of the lower part of the filter water bucket, and an inserting part is arranged on the bottom of the filter water bucket and is located below the limiting convex edge, which is capable of being inserted into the opening of the purified water bucket; when the inserting part is inserted into the opening of the purified water bucket, the limiting convex edge is limited at an edge of the opening of the purified water bucket.

6. The gravity water filter according to claim 1, wherein a transparent watch window is arranged on an outer side wall of the purified water bucket.

7. The gravity water filter according to claim 1, wherein a handle is arranged on top of the cover.

8. The gravity water filter according to claim 1, wherein a supporting base is set at a bottom of the purified water bucket.

9. The gravity water filter according to claim 1, wherein an anti-slip ring is arranged at the bottom of the purified water bucket.

* * * * *